Figure 1:
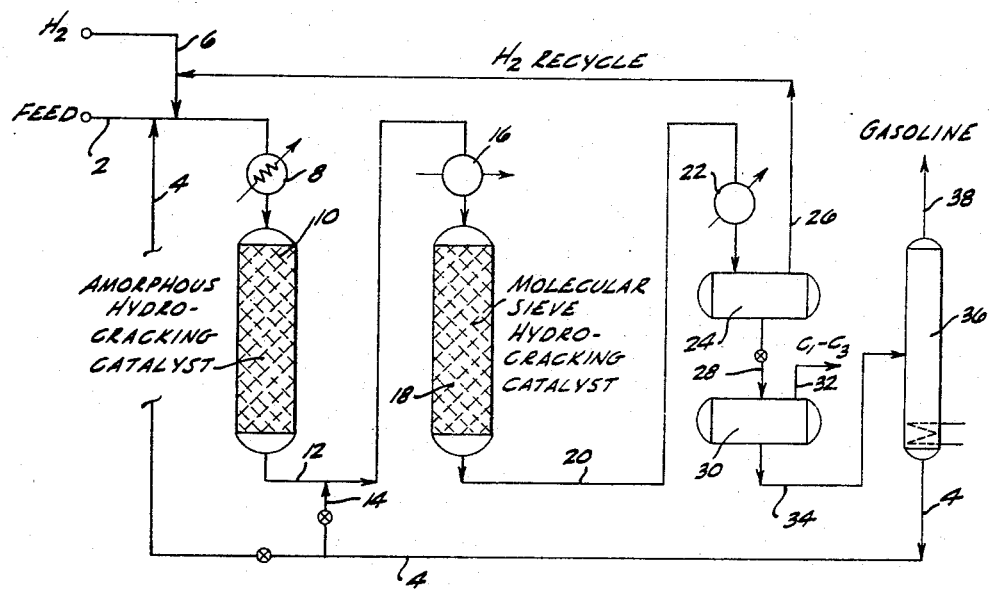

INVENTOR.
DEAN ARTHUR YOUNG,
BY
James S. Henderson
ATTORNEY

United States Patent Office 3,287,252
Patented Nov. 22, 1966

3,287,252
HYROCRACKING PROCESS UTILIZING TWO DIFFERENT TYPES OF CATALYST
Dean Arthur Young, Yorba Linda, Calif., assignor to Union Oil Company of California, Los Angeles, Calif., a corporation of California
Filed May 10, 1962, Ser. No. 193,791
17 Claims. (Cl. 208—59)

This invention relates to catalytic hydrocracking, and more particularly is concerned with the hydrocracking of mineral oil feedstocks containing both aromatic hydrocarbons and paraffin hydrocarbons. The objective is to convert, with maximum efficiency, both the aromatic and paraffinic moieties of the feed to lower boiling hydrocarbons, boiling for example in the gasoline or jet fuel ranges. More particularly, the process is concerned with new methods for increasing the selectivity of hydrocracking, and for obtaining maximum efficiency in catalyst utilization. Briefly stated, the invention embraces a dual-catalyst treatment of the feedstock, wherein said feedstock is contacted under hydrocracking conditions with two different types of hydrocracking catalysts. One type of catalyst comprises a crystalline, zeolitic, molecular sieve cracking base upon which is deposited, preferably by ion-exchange, a minor proportion of a Group VI-B and/or Group VIII hydrogenating metal component. The other type of catalyst comprises an amorphous or gel type cracking base such as coprecipitated silica-alumina upon which is deposited, as by impregnation, a small proportion of a Group VI-B and/or Group VIII hydrogenating metal component.

In one modification of the process, the feedstock is contacted with a mixture of the two types of hydrocracking catalysts, each catalyst being more or less uniformly dispersed throughout the hydrocracking zone. For example, the crystalline catalyst, in powder form, may be admixed with the powdered amorphous catalyst, and the mixture copelleted to form pellets of substantially uniform composition. Alternatively, the crystalline catalyst may be separately pelleted, and the pellets may be commingled with the separately pelleted amorphous catalyst. In all of these modifications, the gross catalyst distribution does not differ significantly from one sector in the hydrocracking zone to another sector.

According to the second major modification of the process, separate beds of the two catalysts are employed in series, with the feed passing first through one and then the other. It is preferred in this modification that the feed should first contact the amorphous catalyst and then the crystalline catalyst.

In the first modification, employing the mixed catalysts, it is particularly desirable that the feed be subjected to an initial catalytic hydrofining pretreatment before contacting the mixed catalyst. But it is also contemplated that the feed may be hydrofined before contacting the separate catalyst beds of the second modification.

It is known in the art that optimum hydrocracking conditions for converting paraffinic hydrocarbons differ considerably from the optimum conditions for converting aromatic hydrocarbons. It has apparently not been appreciated however that different types of catalysts would vary in activity for hydrocracking the different hydrocarbon types. The present invention stems from my discoveries that (1) hydrocracking catalysts based on amorphous cracking bases display maximum efficiency for the conversion of aromatic hydrocarbons, and are relatively inefficient for converting paraffinic hydrocarbons; (2) a relatively newer class of hydrocracking catalysts, based upon certain crystalline, zeolitic molecular sieve cracking bases, are very efficient for the conversion of paraffinic hydrocarbons, but are relatively inefficient for converting aromatic hydrocarbons; and (3) the hydrocracking of paraffinic hydrocarbons over either of the above types of catalysts is inhibited to a marked extent by polycyclic aromatic hydrocarbons present in the feed. Hence, in the hydrocracking of mixed feedstocks, it is found that improved results are obtained by contacting said feedstock with both types of catalysts, as compared to contacting the same feed with either type of catalyst alone. And, in view of the deleterious effects of polycyclic aromatics upon paraffin hydrocracking, it is found preferable in those cases where separate catalyst beds are employed in series, to locate the amorphous catalyst ahead of the crystalline catalyst so that polycyclic aromatics will be mostly converted to hydrogenated and/or hydrocracked products before the crystalline catalyst is contacted.

Without intending to limit the invention to any theoretical explanation for the above discoveries, it is hypothesized that the differing distribution of active sites on the respective catalysts, and the different hydrocracking mechanisms for aromatic and paraffinic hydrocarbons are the underlying factors. It is generally believed that the hydrocracking of aromatic hydrocrabons proceeds first by hydrogenation of an aromatic ring, followed by cracking of the hydrogenated ring. Paraffins on the other hand must be cracked before they can be hydrogenated. Apparently, in the case of molecular sieve type catalysts, or at least those wherein the hydrogenating metal is added by ion-exchange, there is a relatively ineffective distribution of hydrogenation sites at the particular sites upon which aromatic hydrocarbons are preferentially absorbed. The amorphous or gel type catalyst on the other hand appear to embody a more nearly optimum configuration of hydrogenation sites at the sites of preferential absorption of aromatics. These differences might also explain the reverse efficiencies for hydrocracking paraffins. Active paraffin cracking sites of the molecular sieve catalysts can operate relatively independently of a conjoint hydrogenation site. Hence, for paraffin hydrocracking, what is required perhaps is simply a maximum number of acid sites per unit of surface area, the geometry of the hydrogenation sites being such as to favor adsorption and hydrogenation of the olefin fragments. Apparently, the crystalline molecular sieve catalysts display an optimum combination of numerous acid sites, coupled with effective olefin hydrogenation sites, as compared to the more conventional amorphous type of hydrocracking catalyst.

Figure 2:
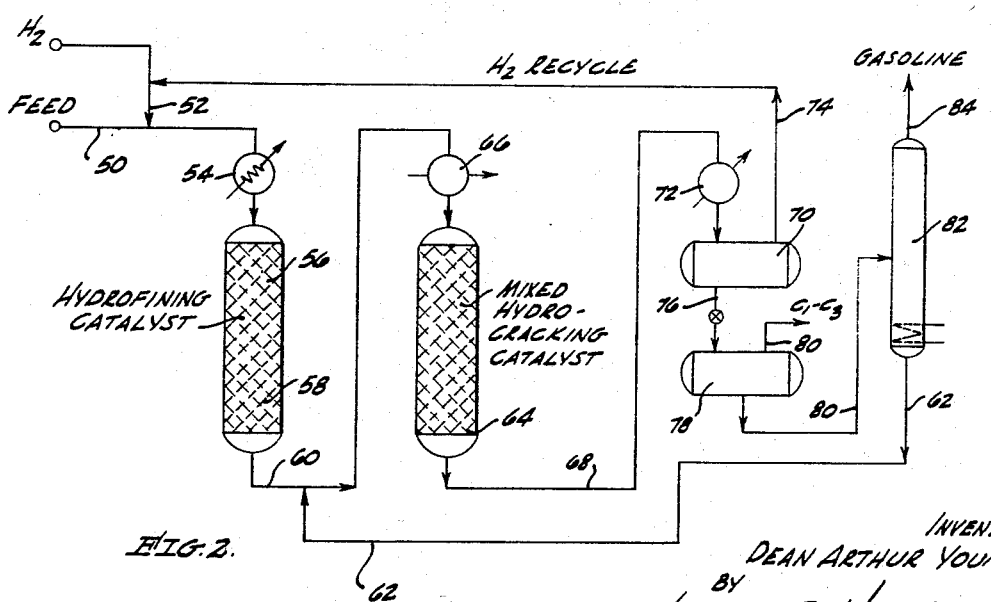

From the foregoing, it will be apparent that the principal object of this invention is to improve overall hydrocracking efficiency of mixed aromatic-paraffinic feedstocks by providing separate catalysts components of maximum efficiency for hydrocracking each type of hydrocarbon present in the feed. An overall objective is to reduce the total catalyst inventory required to maintain a given throughput and conversion to lower boiling hydrocarbons. Still another object is to increase the selectivity of conversion to products of desired boiling range rather than to light gases such as methane, ethane and the like, and to increase the ratio of isoparaffins to normal paraffins in the product. Another object is to prolong the effective life of hydrocracking catalysts which are adversely effected by polycyclic aromatic hydrocarbons. Other objects will be apparent from the more detailed description which follows:

The invention may perhaps be more readily understood with reference to the accompanying drawing. FIGURE 1 is a flowsheet illustrat ing the use of separate beds of the two hydrocracking catalysts. FIGURE 2 is a flowsheet illustrating the use of a mixed bed, and also an integral hydrofining pretreatment. It will be understood that the drawings have been simplified by the omission of certain conventional elements such as valves, pumps, compressors, and the like.

Referring more particularly to FIGURE 1, the initial feedstock, consisting for example of a straight-run gas oil boiling between about 400–800° F., is brought in via line 2 mixed with recycle oil from line 4 (if desired), and with recycle and fresh hydrogen from line 6. The combined mixture is then brought to the desired initial hydrocracking temperature in preheater 8, and passed into first hydrocracking reactor 10, which is filled with a suitable amorphous hydrocracking catalyst to be subsequently described. The feed-hydrogen mixture passes downwardly through hydrocracker 10 in contact with the amorphous catalyst, under conditions within the following general ranges:

AMORPHOUS CATALYST HYDROCRACKING CONDITIONS

|  | Operative | Preferred |
| --- | --- | --- |
| Temperature, °F | 400–850 | 450–700 |
| Pressure, p.s.i.g. | 400–3,000 | 800–2,000 |
| LHSV, v./v./hr. | 0.5–30 | 1.5–15 |
| $H_2$/oil ratio, s.c.f./b. | 500–20,000 | 2,000–12,000 |

Selection of the specific operating conditions will of course depend upon the specific activity of the catalyst involved, as well as other factors such as refractoriness of the feed, and particularly, nitrogen content of the feed. Higher temperatures will normally be employed for feedstocks containing substantial quantitites of nitrogen compounds. It is preferred to adjust the hydrocracking conditions so as to obtain about 10–40 volume-percent conversion per pass to desired product.

The effluent from hydrocracker 10 is withdrawn via line 12, and at this point contains a substantially reduced proportion of polycyclic aromatic hydrocarbons, but still contains substantial amounts of paraffin hydrocarbons boiling above the gasoline range. It is preferred to operate hydrocracker 10 so that the effluent therefrom will contain less than about 2% by volume of polycyclic aromatic hydrocarbons. The presence of monocyclic aromatic hydrocarbons is not detrimental however, since it has been found that they are actually beneficial in the subsequent molecular sieve catalyst conversion zone in that they increase the selectivity of conversion and increase the ratio of isoparaffins to normal paraffins in the final product. If desired, a portion of recycle oil may be mixed with the effluent in line 12 from line 14, the choice depending upon factors to be subsequently considered.

The effluent in line 12 is now transferred via a heat exchanger 16 to molecular sieve hydrocracking reactor 18, in order to effect further paraffin hydrocracking. Heat exchanger 16 may function either as a heater or cooler, depending upon the outlet temperature from reactor 10, and the desired temperature in reactor 18. Since hydrocracking is exothermic, it will normally be desirable to cool the effluent somewhat in exchanger 16. Hydrocracking in reactor 18 may proceed under substantially the same conditions as those in reactor 10. However, due to the reduced proportion of polycyclic aromatics, it is feasible to employ somewhat lower pressures and hydrogen ratios than in reactor 10. Specifically, it is preferred to employ pressures of about 500–2,000 p.s.i.g., and hydrogen rates of about 500–10,000 s.c.f. per barrel of total feed. The temperature is suitably adjusted within the ranges previously specified for reactor 10, so as to obtain an additional conversion of about 10–40 volume-percent per pass.

The effluent from hydrocracker 18 is withdrawn via line 20, condensed in cooling unit 2, and passed into high-pressure separator 24, from which recycle hydrogen is withdrawn via line 26, and recycled to line 6 as previously described. The liquid condensate in separator 24 is then flashed via line 28 into low-pressure separator 30, from which light hydrocarbon gases are exhausted via line 32. The low-pressure condensate in separator 30 is then transferred via line 34 to fractionating column 36, from which desired products such as gasoline are recovered overhead via line 38. The unconverted oil boiling above the desired product range is withdrawn as bottoms via line 4, and may be utilized in other products such as jet fuels, diesel fuels, or the like. Alternatively, it may be recycled via line 4 as illustrated. Normally, the unconverted oil is too rich in polycyclic aromatics to be recycled directly to reactor 18, and if it contains more than about 2% of such polycyclics, it is preferable to recycle all of it to line 2 as previously described. Alternatively, where the polycyclic content is less than about 2%, all or a portion thereof may be diverted via line 14 to line 12 for direct recycle to hydrocracker 18.

Referring now to FIGURE 2, the initial feedstock is brought in via line 50, mixed with recycle and fresh hydrogen from line 52, preheated to incipient hydrofining temperature in heater 54, and then passed directly into hydrofiner 56, containing a bed of hydrofining catalyst 58, where hydrofining proceeds under substantially conventional conditions. Suitable hydrofining catalysts include for example mixtures of the oxides and/or sulfides of cobalt and molybdenum, or of nickel and tungsten, preferably supported on a carrier such as alumina, or alumina containing a small amount of coprecipitated silica gel. Other suitable catalysts include in general the oxides and/or sulfides of the Group VI–B and/or Group VIII metals, preferably supported on substantially non-cracking adsorbent oxide carriers such as alumina, silica, titania, and the like. The hydrofining operation may be conducted either adiabatically or isothermally, and under the following general conditions:

HYDROFINING CONDITIONS

|  | Operative | Preferred |
| --- | --- | --- |
| Temperature, °F | 600–850 | 650–825 |
| Pressure, p.s.i.g. | 500–3,000 | 800–2,000 |
| LHSV, v./v./hr. | 0.5–10 | 1–5 |
| $H_2$/oil ratio, s.c.f./b. | 500–15,000 | 1,000–10,000 |

The above conditions are suitably adjusted so as to reduce the organic nitrogen content of the feed to below about 100 parts per million, and preferably below about 50 parts.

The effluent from hydrofiner 56 is withdrawn via line 60, blended (if desired), with recycle oil from 62, and passed into hydrocracker 64 via heat exchanger 66. Heat exchanger 66 serves to heat or cool the effluent in line 60 to the desired incipient hydrocracking temperature. Hydrocracking in reactor 64 proceeds under conditions within the same general ranges as those previously described for hydrocracker 10 of FIGURE 1, except that the space velocity will be approximately the combined space velocities of reactors 10 and 18. Specifically, space velocities between about 1 and 5 are preferred. If desired, cool hydrogen may be injected at one or more points in the catalyst bed to maintain a more nearly isothermal temperature profile. The catalyst in hydrocracker 64 is a mixture of the two types to be subsequently described, amorphous and crystalline. It may be in the form of copelleted powders, or separate pellets of the two types. Normally, about 40–80 volume-percent conversion to desired products is obtained in reactor 64 by suitably adjusting the process conditions, principally temperature.

The effluent from hydrocracker 64 is withdrawn via line 68 and transferred to high pressure separator 70 via condenser 72. Recycle hydrogen is withdrawn from separator 70 via line 74, and recycled to line 52 as previously described, and the high pressure condensate in separator 70 is then flashed via line 76 into low pressure separator 78, from which light gases are withdrawn via line 80. The low pressure condensate in separator 78 is then transferred via line 80 to fractional distillation column 82, from which desired products such as gasoline are taken overhead via line 84, while unconverted oil is withdrawn as bottoms via line 62. The bottoms fraction may either be diverted to jet fuel and/or diesel products, or recycled to line 60 as previously described.

The initial feedstocks which may be treated herein include in general any mineral oil fraction having an initial boiling point above the conventional gasoline range, i.e., above about 400° F., and having an end-boiling-point of up to about 1,000° F. This includes straight-run gas oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 900° F., having an API gravity of 15–40°, and containing at least about 10% by volume of aromatic components. Such oils may also contain from about 0.1% to 5% of sulfur and from about 0.01% to 2% by weight of nitrogen.

The amorphous catalysts used herein may comprise any desired combination of a conventional amorphous cracking base with a Group VI–B and/or Group VIII metal hydrogenating component. Suitable cracking bases include for example coprecipitated mixtures of two or more difficultly reducible oxides such as silica-alumina, silica-magnesia, silica-zirconia, alumina-boria, silica-titania, silica-zirconia-titania, and the like. Acidic metal phosphates such as aluminum phosphate may also be used. The preferred cracking bases comprise coprecipitated composite gels of silica and alumina containing about 50–90% silica, coprecipitated composites of silica, titania and zirconia containing about 5–75% of each component, coprecipitated composites of silica and magnesia, or of silica and zirconia, and the like. Any of these cracking bases may be further promoted by the addition of a halide such as HF, $BF_3$, $SiF_4$ and the like.

The hydrogenating metal is normally added to the cracking base by aqueous impregnation, and/or by cation exchange methods. Normally, about 0.2 to 25% by weight of hydrogenating component is employed, based on free metal. (The term "hydrogenating component" as used herein, is intended to include the free metals and compounds thereof, e.g., the oxides or sulfides.) The preferred hydrogenating metals are those of the Group VIII noble metal group, and especially platinum, palladium, rhodium and iridium. Nickel, iron, cobalt, chromium, molybdenum and tungsten may be used to less advantage. The noble metals normally are used in relatively small proportions of about 0.2 to 2% by weight. The finished catalysts are preferably employed in the form of ⅛- to ¼-inch pellets or granules.

The term "amorphous" as used herein is intended to designate a solid state wherein crystallinity is not discernible in the powdered material by X-ray diffraction analysis. This does not preclude the presence of microcrystalline micelles, such as may be present in many gel structures. The crystalline molecular sieve structures, on the other hand, display definite crystallinity which is readily detectable by X-ray diffraction analysis.

The molecular sieve catalysts for use herein are distinctly different from the above-described amorphous catalysts. They may contain the same type and amounts of hydrogenating component described in connection with the amorphous catalysts, but this hydrogenating component is deposited upon a partially dehydrated, zeolitic, crystalline molecular sieve, e.g., of the "X" or "Y" crystal types, said molecular sieves having relatively uniform pore diameters of about 8 to 14 A., and comprising silica, alumina, and one or more exchangeable zeolitic cations.

A particularly active and useful class of molecular sieve cracking bases are those having a relatively high $SiO_2/Al_2O_3$ ratio, e.g., between about 3.0 and 6.0. The most active forms are those wherein the exchangeable zeolitic cations are hydrogen and/or a divalent metal such as magnesium, calcium or zinc. In particular, the "Y" molecular sieves, wherein the $SiO_2/Al_2O_3$ ratio is about 5, are preferred, either in their hydrogen form, or a divalent metal form. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Molecular sieves of this nature are described more particularly in Belgian Patents Nos. 577,642, 598,582, 598,683 and 598,682.

Molecular sieves of the Y crystal type are manufactured by the Linde Company, Tonawanda, N.Y., and finished catalysts suitable for use herein are available from that company under the trade names, "MB5390" isomerization catalyst (a decationized Y sieve loaded with 0.5% palladium), "MB1382" hydrocracking catalyst (a magnesium Y sieve loaded with 1% palladium), "MB5382" hydrocracking catalyst (a magnesium Y sieve loaded with 0.5% palladium).

As in the case of the X molecular sieves, the Y sieves also contain pores of relatively uniform diameter in the individual crystals. In the case of X sieves, the pore diameters may range between about 6 and 14 A., depending upon the metal ions present, and this is likewise the case in the Y sieves, although the latter usually are found to have crystal pores of about 9 to 10 A. in diameter.

In the case of molecular sieve type cracking bases, it is desirable to deposit the hydrogenating metal thereon by ion-exchange. This can be accomplished by digesting the zeolite, preferably in its ammonium form, with an aqueous solution of a suitable compound of the desired metal, wherein the metal is present in a cationic form, and then reducing to form the free metal, as described for example in Belgium Patent No. 598,686.

The relative proportions of the amorphous and crystalline catalysts to be employed, whether in a mixed bed as in FIGURE 2, or in separate beds as in FIGURE 1, depends to some extent on the ratio of aromatic and paraffin hydrocarbons present in the feed. Highly aromatic feedstocks will require relatively more of the amorphous catalyst, while highly paraffinic feeds will require more of the crystalline catalyst. Normally, for feedstocks containing about 20–50% by volume of aromatics, it is preferred that about 40–75% of the total catalyst volume be of the amorphous type. In any case, it is preferred to use sufficient of the amorphous catalyst to reduce the content of polycyclic aromatic hydrocarbons to below about 2% by volume of the final hydrocarbon effluent.

The following examples are cited to demonstrate the critical features of the above-described process, but are not intended to be limiting in scope:

*Example I*

In this example tetralin, a typical aromatic hydrocarbon found in gas oils, was subjected to hydrocracking over two molecular sieve catalysts and over two amorphous catalysts in order to determine the relative efficiency of such catalysts for hydrocracking aromatic hydrocarbons. All the tests were carried out at 1,000 p.s.i.g., 8 liquid hourly space velocity, and using 20,000 s.c.f. of hydrogen per barrel of feed. The relative conversions were measured in terms of product gravities, an increase in gravity over that of the feed indicating hydrogenation and/or hydrocracking. In all cases where the product gravity is above 25.6° API, there was necessarily some substantial hydrocracking, because simple hydrogenation of tetralin results mainly in cis-decalin which has a gravity of 25.6° API. The catalysts tested were as follows:

*Catalyst No. 1.*—A crystalline, zeolitic Y molecular sieve in its hydrogen form (decationized), and loaded by ion-exchange with 0.5% by weight of palladium (Linde MB5390 isomerization catalyst).

*Catalyst No. 2.*—A crystalline, zeolitic Y molecular sieve in its magnesium form, containing about 3% by weight of magnesium and 0.5% by weight of palladium added by ion-exchange (Linde hydrocracking catalyst MB5382).

*Catalyst No. 3.*—A synthetic, coprecipitated amorphous silica-alumina cracking catalyst containing about 87% silica and 13% alumina, and containing 0.4% palladium added by impregnation with palladium chloride solution.

*Catalyst No. 4.*—A synthetic, coprecipitated silica-alumina cracking catalyst, as in Catalyst No. 3, containing 0.5% of palladium incorporated therein by ion-exchange with an aqueous solution of a tetrammine palladium complex.

The results of the several tests were as follows:

TABLE 1.—HYDROCRACKING OF TETRALIN

| Catalyst No. | 1 | | 2 | | 3 | | 4 | |
|---|---|---|---|---|---|---|---|---|
| Composition | Crystalline H-"Y" sieve +0.5% Pd | | Crystalline Mg-"Y" sieve +0.5% Pd | | Amorphous $SiO_2$-$Al_2O_3$ +0.4% Pd | | Amorphous $SiO_2$-$Al_2O_3$ +0.5% Pd | |
| Gravity of feed, °API | 14.4 | | 14.4 | | 14.4 | | 14.4 | |
| Hours on stream | 1 | 17 | 1 | 7 | 2 | 20 | 1 | 23 |
| Temp., °F | 600 | 600 | 650 | 670 | 611 | 611 | 612 | 612 |
| Product gravity, °API | 38.9 | 24.2 | 29 | 15.4 | 31.2 | 30.9 | 30 | 31.1 |

Example II

It will be noted that the initial high activity of catalysts 1 and 2 declined rapidly, so that after a few hours substantially no hyrocracking was taking place. In contrast, catalysts 3 and 4 did not diminsh in hydrocracking activity over a period of at least 20 hours. It is thus clear that the amorphous catalysts display a much higher sustained activity for hydrocracking aromatic hydrocarbons than do the crystalline catalysts 1 and 2.

Catalysts 1 and 4 of Example I were compared in activity for the hydrocracking of a typical gas oil paraffin, namely n-dodecane. The hydrocracking conditions were the same as in Example I, and product gravities likewise indicate hydrocracking activity, except that in this case it should be noted that any increase in product gravity over the feed gravity necessarily indicates hydrocracking, since further saturation without cracking is not possible. The results of the test were as follows:

TABLE 2.—HYDROCRACKING OF n-DODECANE

| Catalyst No. | | | |
|---|---|---|---|
| 1 | | 4 | |
| Composition | | | |
| Crystalline H-"Y" sieve +0.5% Pd | | Amorphous $SiO_2$-$Al_2O_3$ +0.5% Pd | |
| Gravity of feed, °API | | | |
| 56.4 | | 56.4 | |
| Temp., °F | Product gravity, °API | Temp., °F | Product gravity, °API |
| 550 | 60 | 606 | 57.0 |
| 598 | 70.2 | 604 | 57.1 |
| 600 | 71 | 658 | 58.4 |
| 651 | 86.8 | 655 | 59.0 |
| 651 | 88.4 | 656 | 59.8 |
| 650 | 87.8 | 655 | 59.0 |
| 649 | 87.7 | | |

The much higher initial and sustained activity of the molecular sieve catalyst for hydrocracking paraffins is clearly apparent.

Example III

This example demonstrates the deleterious effects of polycyclic aromatics upon paraffin hydrocracking. A molecular sieve hydrocracking catalyst, essentially identical to Catalyst No. 1 of Example I, was first used to hydrocrack n-dodecane, then a mixture of n-dodecane and naphthalene, and finally the pure n-dodecane, the run being continuous. Hydrocracking conditions were the same as in Example I. The results were as follows:

TABLE 3.—HYDROCRACKING OF n-DODECANE-NAPHTHALENE MIXTURE AT 600° F.

| Feed naphthalene content | Hours on stream | Product characteristics | |
|---|---|---|---|
| | | Gravity, °API | Vol. percent $C_3$-$C_9$ |
| None | 11 | 69.3 | |
| Do | 14 | 70.3 | |
| Do | 17 | 70.3 | 53.4 |
| 5 vol. percent | 19 | 67.4 | |
| Do | 23 | 63.1 | |
| Do | 29 | 61.6 | 47.9 |
| Do | 36 | 59.7 | 17.1 |
| None | 38 | 63.1 | |
| Do | 41 | 64.1 | 29.2 |

The foregoing results clearly shown that, upon adding 5% naphthalene to the feed, the conversion dropped rapidly. They also show that the catalyst was not permanently deactivated, for upon eliminating naphthalene from the feed, the conversion began to increase. This deactivating effect is not observed however when monocyclic aromatics are added to the feed.

Example IV

To compare the results obtainable by the use of a dual-catalyst bed vs. each single catalyst, a mixed feedstock (21.6° API gravity) containing 21.5 wt. percent n-dodecane, 21.5% naphthalene and 57% tetralin, (these materials being typical gas oil hydrocarbons) was subjected to hydrocracking at 1,000 p.s.i.g., 8.0 LHSV and using 20,000 s.c.f. of hydrogen per barrel of feed, in the following series of runs:

*Run A.*—The feed was passed over a unitary bed of amorphous $SiO_2$-$Al_2O_3$ cogel (87/13 weight ratio) granules upon which was deposited by ion-exchange) 0.5 by weight of palladium.

*Run B.*—The feed was passed over a unitary bed of granular molecular sieves of the Y crystal type in their "decationized" or hydrogen form, upon which was deposited by ion-exchange 0.5% by weight of palladium (Linde isomerization catalyst MB4600 AD).

*Run C.*—The feed was passed first over a bed of the amorphous catalyst used in Run A, and then over an equal-volume bed of the molecular sieve catalyst used in Run B, the combined volume of the two beds being the same as used in each of Runs A and B.

*Run D.*—A continuation of Run C with an enlarged upper bed of amorphous catalyst, so as to give a lower space velocity over the amorphous catalyst.

The results of the various runs were as follows:

TABLE 4

| Run | A | | | B | | | C | | | D | | |
|---|---|---|---|---|---|---|---|---|---|---|---|---|
| First catalyst bed | Pd-SiO$_2$-Al$_2$O$_3$ cogel | | | Pd-sieve | | | Pd-SiO$_2$-Al$_2$O$_3$ cogel | | | Pd-SiO$_2$-Al$_2$O$_3$ cogel | | |
| LHSV | 16.0 | | | 16.0 | | | 16.0 | | | 13.3 | | |
| Second catalyst bed | P␣1-SiO$_2$-Al$_2$O$_3$ cogel | | | Pd-sieve | | | Pd-sieve | | | Pd-sieve | | |
| LHSV | 16.0 | | | 16.0 | | | 16.0 | | | 16.0 | | |
| Hours on stream | 1 | 17 | 38 | 4 | 11 | 14 | 2 | 21 | | 2 | 24 | |
| Avg. bed temp, °F | 608 | 603 | 631 | 605 | 600 | 648 | 606 | 607 | | 590 | 590 | |
| Product gravity, °API | 36.8 | 36.9 | 37.3 | 39.5 | 27.4 | 26.9 | 40.2 | 37.2 | | 43.4 | 40.6 | |
| Product composition: | | | | | | | | | | | | |
| Butanes, vol percent | 0.15 | 0.11 | 0.18 | 1.69 | 0.04 | 0.18 | 1.63 | 0.38 | | 2.23 | 1.38 | |
| Pentanes, vol percent | 0.13 | 0.13 | 0.14 | 0.72 | 0.01 | 0.06 | 0.87 | 0.18 | | 1.59 | 0.74 | |
| Hexanes, vol percent | 0.18 | <0.02 | 0.08 | 0.71 | <0.01 | 0.06 | 0.86 | 0.13 | | 1.66 | 0.72 | |
| Iso/Normal ratios: | | | | | | | | | | | | |
| Butanes | 3 | 3 | 5 | 8 | 3 | 0.6 | 6 | 7 | | 30 | 7 | |
| Pentanes | 2 | 2 | 2 | 4 | (¹) | (¹) | 3 | 5 | | 5 | 8 | |
| Hexanes | 2 | (¹) | 3 | 20 | (¹) | (¹) | 4 | (¹) | | (¹) | (¹) | |
| Naphthenes, vol percent: | | | | | | | | | | | | |
| Cyclopentanes | 1 | 1 | 1 | 13 | 0 | 0 | 10 | 3 | | 21 | 12 | |
| Cyclohexanes | 7 | 6 | 7 | 4 | 4 | 17 | 5 | 6 | | 1 | 4 | |
| Decalin | 75 | 75 | 75 | 64 | 22 | 12 | 64 | 71 | | 60 | 66 | |
| Aromatics, vol percent: | | | | | | | | | | | | |
| Benzene | 0.4 | 0.4 | 0.4 | 0.4 | 1.8 | 2.8 | 0.4 | 0.4 | | 0.3 | 0.3 | |
| Tetralin | 0.4 | 0.4 | 0.5 | 3.0 | 50.6 | 50.4 | 3.0 | 1.7 | | 0.2 | 0.3 | |
| Naphthalene | 0.1 | <0.1 | <0.1 | 0.1 | 0.3 | 1.1 | <0.1 | <0.1 | | <0.1 | <0.1 | |

¹ Normal paraffin concentration was too low to determine iso/normal ratio.

The foregoing data shows that overall superior results were obtained in Runs C and D, as compared to either of Runs A and B. In Run A, the product gravities were comparable to those of Run C, but in Run C the high product gravity reflects relatively more paraffin cracking, while in Run A it reflects hydrogenation and cracking of tetralin and naphthalene, with very little paraffin cracking. Moreover, it will be noted that the isoparaffin/normal paraffin ratios were much higher in Runs C and D than in Run A.

In Run B, there was a high initial activity, but this fell off very rapidly, so that at the end of 14 hours there was very little conversion even at 648° F., the tetralin content of the product being almost as high as the feed.

Run D shows that, for highly aromatic feeds, relatively more of the amorphous catalyst should be employed.

Similar differential results are obtained when runs such as A and B are compared with runs where a mixture of the two catalysts is used.

Results analogous to those indicated in the foregoing examples are obtained when other catalysts and conditions, other feedstocks and other process conditions within the broad purview of the above disclosure are employed. It is hence not intended to limit the invention to the details of the examples or drawing, but only broadly as defined in the following claims:

I claim:
1. A process for hydrocracking a hydrocarbon feedstock containing both paraffinic and aromatic hydrocarbons, which comprises: contacting said feedstock plus added hydrogen with two different, separately pelleted, hydrocracking catalysts A and B under hydrocracking conditions of temperature and pressure, catalyst A being employed to provide maximum hydrocracking efficiency for the aromatic component of said feedstock and consisting essentially of a pelleted, amorphous solid cracking base upon which is deposited a small proportion of a hydrogenating component, catalyst B being employed to provide maximum hydrocracking efficiency for the paraffinic component of said feedstock and consisting essentially of a separately pelleted, crystalline, zeolitic molecular sieve cracking base composed essentially of silica and alumina wherein the SiO$_2$/Al$_2$O$_3$ mole-ratio is at least about 3, and upon which is deposited a small proportion of a hydrogenating component, and recovering desired low-boiling hydrocarbons from said hydrocracking, the hydrogenating component on each of said catalyst being selected from the class consisting of the Group VI–B and Group VIII metals, at least the initial portion of said contacting being carried out in a hydrocracking zone containing catalyst A, the liquid hourly space velocity during said hydrocracking being between 0.5 and 30 with respect to said catalyst A, and between 0.5 and 30 with respect to said catalyst B.

2. A process as defined in claim 1 wherein said molecular sieve cracking base is of the Y crystal type containing zeolitic hydrogen ions, and wherein said hydrogenating component is added thereto by cation exchange.

3. A process as defined in claim 1 wherein said amorphous solid cracking base is a composite of silica gel coprecipitated with at least one other gel from the class consisting of alumina, zirconia, titania and magnesia.

4. A process as defined in claim 1 wherein the hydrogenating component on said amorphous solid cracking base is a Group VIII noble metal.

5. A process as defined in claim 1 wherein the hydrogenating component on said zeolitic molecular sieve cracking base is a Group VIII noble metal.

6. A process as defined in claim 1 wherein said feedstock is a mineral oil fraction boiling above the gasoline range, and wherein said desired low boiling hydrocarbons recovered as product comprise gasoline.

7. A process for hydrocracking a hydrocarbon feedstock containing both paraffinic and aromatic hydrocarbons, which comprises: first subjecting said feedstock plus added hydrogen to catalytic hydrocracking in a first zone at a liquid hourly space velocity between about 0.5 and 30, under hydrocracking conditions in contact with a catalyst consisting essentially of a pelleted, amorphous solid cracking base upon which is deposited a small proportion of a hydrogenating component to effect a selective hydrocracking of aromatic hydrocarbons in said feedstock, then subjecting the effluent from said first contacting zone to a second contacting, at a space velocity between about 0.5 and 30 and under hydrocracking conditions, with a catalyst consisting essentially of a separately pelleted, crystalline, zeolitic molecular sieve cracking base composed essentially of silica and alumina wherein the SiO$_2$/Al$_2$O$_3$ mole-ratio is at least about 3, and upon which is deposited a small proportion of a hydrogenating component, and recovering desired low-boiling hydrocarbons from said second contacting, the hydrogenating component on each of said catalysts being selected from the class consisting of the Group VI–B and Group VIII metals.

8. A process as defined in claim 7 wherein said molecular sieve cracking base is of the Y crystal type containing zeolitic hydrogen ions, and wherein said hydrogenating component is added thereto by cation exchange.

9. A process as defined in claim 7 wherein said amorphous solid cracking base is a composite of silica gel coprecipitated with at least one other gel from the class consisting of alumina, zirconia, titania and magnesia.

10. A process as defined in claim 7 wherein the hydrogenating component on said amorphous solid cracking base is a Group VIII noble metal.

11. A process as defined in claim 7 wherein the hydrogenating component on said zeolitic molecular sieve cracking base is a Group VIII noble metal.

12. A process as defined in claim 7 wherein the conditions in said contacting are controlled so as to reduce the content of aromatic polycyclic hydrocarbons in said feed to below about 2% by volume of the hydrocarbon effluent therefrom.

13. A process for hydrocracking a hydrocarbon feedstock containing both paraffinic and aromatic hydrocarbons, which comprises: subjecting said feedstock in admixture with hydrogen to catalytic hydrocracking in contact with a mixed bed of catalyst comprising two distinct, separately pelleted catalysts A and B, substantially homogenerously distributed within the contacting zone, catalyst A being employed to provide maximum hydrocracking efficiency of the aromatic component of said feedstock and consisting essentially of a pelleted, amorphous solid cracking base upon which is deposited a small proportion of a hydrogenating component, catalyst B being employed to provide maximum hydrocracking efficiency of the paraffinic component of said feedstock and consisting essentially of a separately pelleted, crystalline, zeolitic molecular sieve cracking base composed essentially of silica and alumina wherein the $SiO_2/Al_2O_3$ mole-ratio is at least about 3, and upon which is deposited a small proportion of a hydrogenating component, and recovering desired low-boiling hydrocarbons from said contacting, the hydrogenating component on each of said catalysts being selected from the class consisting of the Group VI–B and Group VIII metals, the liquid hourly space velocity of said hydrocracking being between about 0.5 and 30 with respect to said catalyst A, and between about 0.5 and 30 with respect to said catalyst B.

14. A process as defined in claim 13 wherein said molecular sieve cracking base is of the Y crystal type containing zeolitic hydrogen ions, and wherein said hydrogenating component is added thereto by cation exchange.

15. A process as defined in claim 13 wherein said amorphous solid cracking base is a composite of silica gel coprecipitated with at least one other gel from the class consisting of alumina, zirconia, titania and magnesia.

16. A process as defined in claim 13 wherein the hydrogenating component on said amorphous solid cracking base is a Group VIII noble metal.

17. A process as defined in claim 13 wherein the hydrogenating component on said zeolitic molecular sieve cracking base is a Group VIII noble metal.

References Cited by the Examiner
UNITED STATES PATENTS

| | | | |
|---|---|---|---|
| 2,854,400 | 9/1958 | Weisz | 208—111 |
| 2,962,435 | 11/1960 | Fleck et al. | 208—120 |
| 2,971,900 | 2/1961 | Weekman | 208—112 |
| 2,983,670 | 5/1961 | Seubold | 208—111 |
| 3,008,895 | 11/1961 | Hansford et al. | 208—112 |
| 3,039,953 | 6/1962 | Eng | 208—120 |
| 3,132,086 | 5/1964 | Kelley et al. | 208—112 |
| 3,140,251 | 7/1964 | Kelley et al. | 208—120 |

DELBERT E. GANTZ, *Primary Examiner.*

ALPHONSO D. SULLIVAN, PAUL M. COUGHLAN,
*Examiners.*

A. RIMENS, *Assistant Examiner.*

UNITED STATES PATENT OFFICE
CERTIFICATE OF CORRECTION

Patent No. 3,287,252

November 22, 1966

Dean Arthur Young

It is hereby certified that error appears in the above numbered patent requiring correction and that the said Letters Patent should read as corrected below.

Column 3, line 69, for "2" read -- 22 --; column 6, line 15, beginning with "Molecular sieves" strike out all to and including "palladium)." in line 23, same column 6; column 7, line 32, strike out "Example II" and insert the same between lines 39 and 40, same column 7; column 11, line 12, for "said contacting" read -- said first contacting --.

Signed and sealed this 12th day of September 1967.

(SEAL)
Attest:

ERNEST W. SWIDER
Attesting Officer

EDWARD J. BRENNER
Commissioner of Patents